(12) United States Patent
Roca et al.

(10) Patent No.: US 11,127,297 B2
(45) Date of Patent: Sep. 21, 2021

(54) TRAFFIC ENVIRONMENT ADAPTIVE THRESHOLDS

(71) Applicant: Veoneer US, Inc., Southfield, MI (US)

(72) Inventors: Juan Roca, Ogden, UT (US); Shan Cong, Ogden, UT (US)

(73) Assignee: VEONEER US, INC., Southfield, MI (US)

( * ) Notice: Subject to any disclaimer, the term of this patent is extended or adjusted under 35 U.S.C. 154(b) by 648 days.

(21) Appl. No.: 15/651,287

(22) Filed: Jul. 17, 2017

(65) Prior Publication Data

US 2019/0019412 A1 Jan. 17, 2019

(51) Int. Cl.
  *G08G 1/16* (2006.01)
  *G05D 1/02* (2020.01)
  (Continued)

(52) U.S. Cl.
  CPC .............. *G08G 1/166* (2013.01); *B60W 30/08* (2013.01); *G01S 7/411* (2013.01); *G01S 13/87* (2013.01); *G01S 13/931* (2013.01); *G05D 1/0214* (2013.01); *G08G 1/04* (2013.01); *G08G 1/167* (2013.01); *G08G 1/168* (2013.01); *G01S 7/415* (2013.01); *G01S 2013/932* (2020.01); *G01S 2013/9314* (2013.01); *G01S 2013/9315* (2020.01); *G01S 2013/9323* (2020.01); *G01S 2013/93271* (2020.01); *G01S 2013/93272* (2020.01); *G01S 2013/93274* (2020.01);
  (Continued)

(58) Field of Classification Search
  CPC ........ G08G 1/166; B60W 30/08; G01S 7/411; G01S 13/87; G01S 13/931; G05D 1/0214
  See application file for complete search history.

(56) References Cited

U.S. PATENT DOCUMENTS

| 7,385,486 B2 | 6/2008 | Danz et al. |
| 7,978,096 B2 | 7/2011 | Reed et al. |

(Continued)

FOREIGN PATENT DOCUMENTS

| DE | 102008026396 | 12/2008 | |
| DE | 102013004271 A1 * | 9/2013 | ......... G06K 9/00825 |

(Continued)

OTHER PUBLICATIONS

English translation of Kenshi (Year: 2015).*
(Continued)

*Primary Examiner* — Bao Long T Nguyen
*Assistant Examiner* — Bakari Underwood
(74) *Attorney, Agent, or Firm* — Burns & Levinson, LLP; Steven M. Mills

(57) ABSTRACT

Cross traffic alert system for a host vehicle engaged in a forward or reverse gear position, includes an object detection sensor configured to detect relative positions of a plurality of target objects present in a coverage zone proximate the vehicle, and a processor for receiving the target positional data, detecting established environmental states based on the received data, and classifying a driving environment (e.g., road, parking lot, etc.) based on the detection or not of established environmental states. Threshold alert areas are dynamically adjustable in the coverage zones based on the classified driving environment, where indications of targets in the alert areas may be generated.

21 Claims, 9 Drawing Sheets

(51) Int. Cl.
*G08G 1/04* (2006.01)
*G01S 13/931* (2020.01)
*G01S 13/87* (2006.01)
*B60W 30/08* (2012.01)
*G01S 7/41* (2006.01)
*G05D 1/00* (2006.01)
*G06K 9/00* (2006.01)

(52) U.S. Cl.
CPC ....... *G05D 1/0088* (2013.01); *G06K 9/00805* (2013.01); *G06K 9/00812* (2013.01)

(56) References Cited

U.S. PATENT DOCUMENTS

| | | | |
|---|---|---|---|
| 8,072,352 B2 | 12/2011 | Reed et al. | |
| 9,064,408 B2 | 6/2015 | Komoguchi et al. | |
| 2002/0128751 A1 | 9/2002 | Engstrom et al. | |
| 2003/0098811 A1* | 5/2003 | Nikolai | G01S 5/14 342/458 |
| 2004/0189451 A1* | 9/2004 | Zoratti | B60Q 9/008 340/435 |
| 2004/0252027 A1* | 12/2004 | Torkkola | G08B 21/06 340/576 |
| 2005/0096829 A1 | 5/2005 | Sugano et al. | |
| 2008/0009990 A1* | 1/2008 | Katoh | B62D 15/0285 701/36 |
| 2008/0211644 A1 | 9/2008 | Buckley et al. | |
| 2008/0258884 A1 | 10/2008 | Schmitz | |
| 2008/0306666 A1* | 12/2008 | Zeng | B60Q 9/006 701/70 |
| 2009/0045928 A1* | 2/2009 | Rao | G08G 1/168 340/435 |
| 2010/0271237 A1 | 10/2010 | Reed et al. | |
| 2010/0271238 A1 | 10/2010 | Reed et al. | |
| 2012/0041632 A1 | 2/2012 | Bordes | |
| 2013/0057397 A1* | 3/2013 | Cutler | B62D 15/0255 340/435 |
| 2013/0060421 A1* | 3/2013 | Kadowaki | B62D 15/027 701/36 |
| 2014/0028451 A1 | 1/2014 | Takahashi et al. | |
| 2014/0088855 A1 | 3/2014 | Ferguson | |
| 2015/0175063 A1 | 6/2015 | Takahashi et al. | |
| 2015/0284000 A1* | 10/2015 | Hayakawa | B60W 30/06 701/70 |
| 2016/0075332 A1* | 3/2016 | Edo-Ros | B60W 30/0956 701/70 |
| 2016/0114804 A1* | 4/2016 | Kojima | G01S 7/4808 701/1 |
| 2016/0185348 A1* | 6/2016 | Miura | B60W 30/0953 701/41 |
| 2016/0252903 A1* | 9/2016 | Prokhorov | B60W 40/02 701/23 |
| 2016/0272115 A1 | 9/2016 | Max et al. | |

FOREIGN PATENT DOCUMENTS

| | | |
|---|---|---|
| EP | 2763123 | 8/2014 |
| JP | 5435172 | 12/2013 |
| WO | 2010013542 | 2/2010 |
| WO | 2010045626 | 4/2010 |
| WO | 2012021668 | 2/2012 |
| WO | 2014075936 | 5/2014 |
| WO | WO-2015152304 A1 * | 10/2015 ............ G08G 1/166 |
| WO | 2016170786 A1 | 10/2016 |

OTHER PUBLICATIONS

NPL English translation of Knöppel (DE-102013004271) (Year: 2013).*
International Search Report and Written Opinion in corresponding International Application No. PCT/US2018/042221, dated Oct. 18, 2018; 89 pages.

* cited by examiner

TRAFFIC ENVIRONMENT ADAPTIVE THRESHOLDS

BACKGROUND

1. Technical Field

The present disclosure is related to automotive radar and/or camera systems, in particular, to systems that provide cross traffic driver alerts and/or autonomous collision avoidance system activations.

2. Discussion of Related Art

Many newer vehicles have a rear cross traffic alert system for notifying a driver of the presence of a target vehicle within a specified alert zone. The rear cross traffic alert device detects objects of interest that may collide with the host vehicle. When the target vehicle has entered the alert zone, an audible, haptic or visual queue alerts the driver of the presence of the target vehicle.

Many conventional cross-path detection systems utilize a static alert zone defined in part by a static longitudinal threshold relative to the host vehicle. A problem with use of a single static threshold is that the required threshold should be different depending on the scenario (road, parking lot). In a parking lot, it would be preferable to extend the threshold to the width of a parking lane and alert the driver on all incoming targets. On a road, it would be preferred to reduce the threshold to include only targets travelling on a first lane. On busy roads, second lane alerts can be considered a nuisance and classified as a false positive by the customer.

There is therefore a need for improved systems and methods for cross-path detection in order to balance different requirements in the definition of the alert zone. These and other needs are met by way of the present disclosure.

SUMMARY

Systems and methods are presented herein for improved cross-path performance and responses to objects of interest positioned within a zone of interest adjacent a host vehicle. A cross traffic alert (CTA) system includes a sensor mounted to the host vehicle and configured to detect and track, over multiple points in time, relative positions of a plurality of target objects present in the detection zone in a direction corresponding to the position in which the host vehicle's driving gear is engaged. One or more processors integral to, or used by, the CTA system may be configured to receive target object relative positional data detected by the target detection sensor, determine position and trajectory of different targets, and detect (or attempt to detect) an environmental state based on the received target data. A driving environment in the coverage zone may be identified by classification based on the detection (or not) of an established environmental state. For example, the driving environment may be classified based on filtered target object positional data when the environmental state is not established, or based on the quality of the environmental state information when the environmental state has been established from several targets. Once a driving environment has been determined, corresponding longitudinal alert thresholds may be dynamically adjusted to a setting that corresponds to the determined driving environment.

In the disclosed embodiments, the driving environment may include a variety of scenarios including, for example, parking lots, roadways, blocked views, parking structures, types of roads, intersections, etc. If a target vehicle is detected within the longitudinal alert threshold corresponding to the classified driving environment, an alert may be generated. In parking lot driving environments, the longitudinal alert threshold could be extended to cover the width of an entire parking lane, or another dimension, either of which could comprise a user selection. In road driving environments, the longitudinal alert threshold could be reduced to cover only a specified lane (e.g., the driving lane) or portion of the road. If the driving environment is unknown or the decision is not mature enough, the threshold alert area settings may be defaulted to settings associated with a parking lot driving environment.

In some embodiments, the dynamic adjustment of the threshold alert area settings may occur gradually between a first threshold and a second threshold.

In some embodiments, the CTA system detects the environmental state by identifying tracks for all target objects in the detection zone, and filtering the identified tracks to remove target tracks of unlikely relevance. The tracks may also be filtered based on the respective ages of the target tracks. The tracks may also be filtered based on a possible target object trajectory change, where the possible target object trajectory change is estimated by solving a multiple hypothesis problem characterized by independent calculations across a first plurality of the time points, the multiple hypothesis problem supposing a plurality of possible cross-path angle solutions, each cross-path angle solution representing a corresponding possible trajectory for the target object. The target tracks may also be filtered based on a track stability measure, or upon a comparison of a detected speed environmental state of a target object to a minimum speed threshold.

In some embodiments, the CTA system may filter the target tracks based on a comparison of a shortest path distance of a target object to a maximum longitudinal distance threshold, where the shortest path distance is determined as a projection of a distance between a position of the host vehicle and a position of the target object along an axis perpendicular to a trajectory of the target object. A minimum target speed may be assumed to be typical in road driving environments, while a maximum target speed may be assumed in a parking lot environment.

The processor will determine the correct environmental state by collecting information from all objects of interest. From the targets, characteristics unique to a road environment will be identified, such as speed and position relative to the host vehicle. Once a road environment has been identified, this setting may be locked and the alert threshold set to the road setting regardless of the target speed.

In an embodiment where the driving environment is determined to be by default a parking lot, the adjustment of the longitudinal threshold setting may occur gradually from a more relaxed threshold that is typical of a parking lot scenario to a tighter threshold that is more typical of a road environment. The selection of the threshold is a function of the vehicle target speed and the aim is to provide a smooth transition between the two different thresholds required between the different environment.

In various embodiments, the object detection sensor may be mounted to rear, front or both ends of the host vehicle. The object detection sensor may comprise a radar transmitter and receiver, and/or an object tracking camera configured to capture images of the target objects, the object tracking camera being mountable in the host vehicle.

BRIEF DESCRIPTION OF THE DRAWING

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein.

Figure 1:
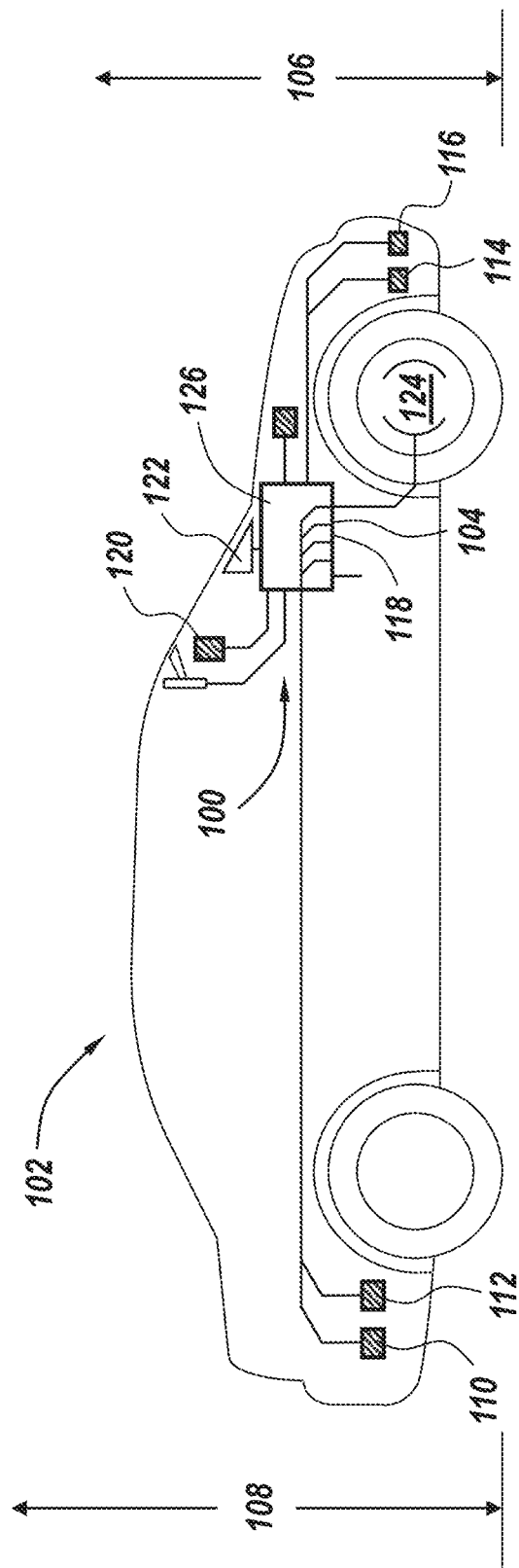
FIG. 1 is a schematic illustration of a host vehicle configured with a cross-traffic alerting system.

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

The following discussion of embodiments of cross-traffic detection and alerting (CTA) systems for determining whether a host vehicle is on a roadway or parking lot, and dynamically adjusting a threshold alert area in a zone of interest adjacent the host vehicle based on said determination is merely exemplary in nature, and is in no way intended to limit the disclosed embodiments or their applications or uses. Alternatives to the embodiments disclosed may be devised without departing from the scope of the disclosure. For example, the discussion below may particularly refer to a host vehicle engaging in backing out of a parking space. However, as will be appreciated by those skilled in the art, in alternate embodiments, the host vehicle may be engaged in a forward gear for driving out of the parking spot. The type of driving environment detected may include more than parking lots and roadways. For example, the techniques described herein may be extended to include determinations that the driving environment includes one or more blocked view, parking structure, particular types of roads, traffic intersections, etc. Similarly, many of the embodiments describe the use of automotive radar systems in acquiring dynamic positional information regarding target objects in a zone of interest adjacent the vehicle. However, alternative or additional types of sensing systems may be employed, such as cameras configured for object tracking.

Well-known elements of technologies associated with the embodiments will not be described in detail, or will be omitted, so as not to obscure the relevant details of the novel methods and apparatus. The word "exemplary" is used herein to mean "serving as an example, instance, or illustration." Any embodiment described herein as "exemplary" is not necessarily to be construed as preferred or advantageous over other embodiments. Likewise, the term "embodiment" and the descriptive language associated with each use of the term do not require that all embodiments include the discussed feature, limitation, advantage or mode of operation. As used herein, the singular forms "a", "an" and "the" are intended to include the plural forms as well, unless the context clearly indicates otherwise. It will be further understood that the terms "comprises", "comprising", "having", "includes" and/or "including", when used herein, specify the presence of stated features, steps, operations, elements, and/or components, but do not preclude the presence or addition of one or more other features, steps, operations, elements, components, and/or groups thereof.

Further, several embodiments are described in terms of sequences of actions to be performed by, for example, by a processor, or by "logic configured to" perform said actions. It will be recognized that various actions described herein can be performed by specific circuits (e.g., application specific integrated circuits (ASICs)), by program instructions being executed by one or more processors, or by a combination of both.

With reference to the block diagram of FIG. 1, described is an embodiment of a CTA system 100 and methods for improved cross-traffic detection and alerting implemented on a host vehicle 102 and utilizing a target object sensing system 110, such as an automotive radar system, and a processor 104. Generally speaking, the systems and methods of the present disclosure may utilize automotive radar sensing systems to classify whether a detection zone of interest adjacent, i.e., detection zone 106 in front of, or detection zone 108 behind host vehicle 102 (depending on which driving gear is engaged) comprises a parking lot, roadway, or other driving environment.

Figure 2:
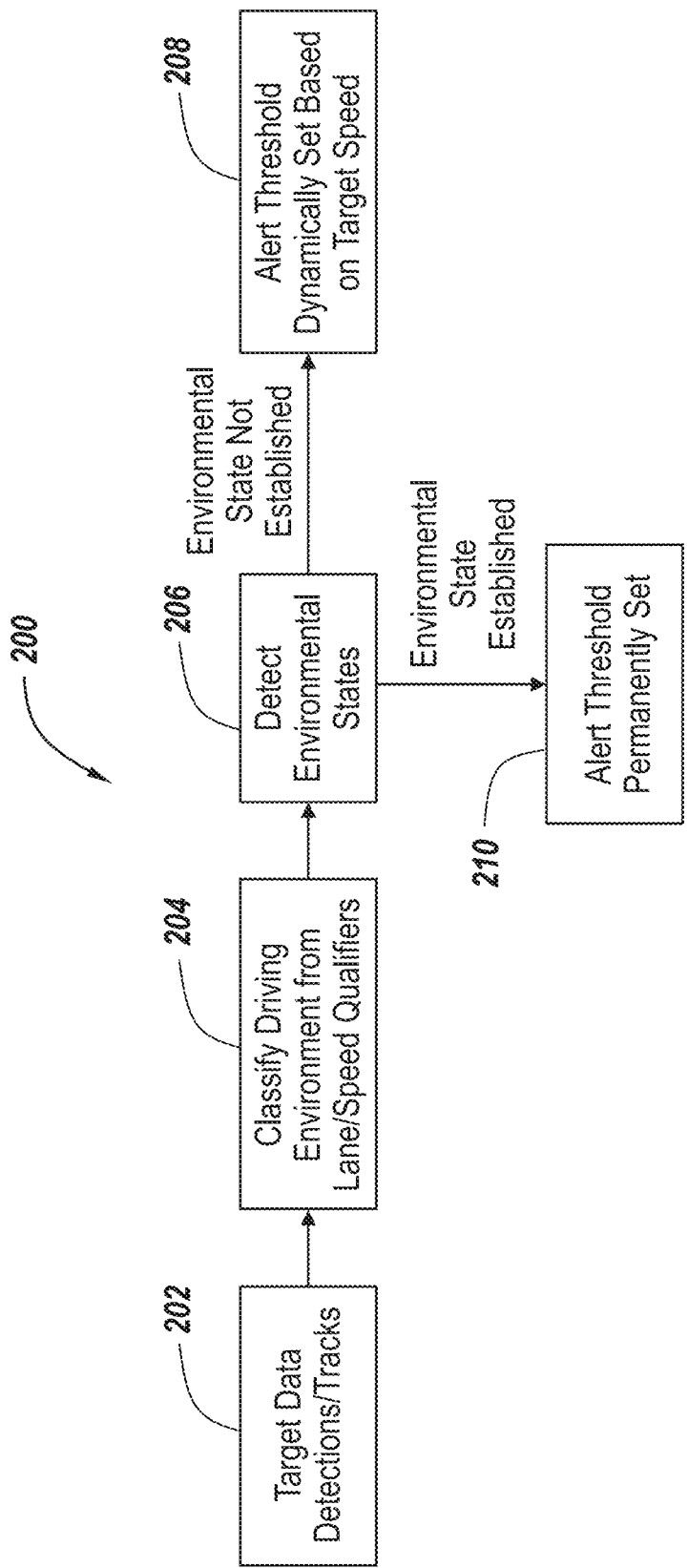
FIG. 2 is a high-level functional flow diagram of a method of improved cross-traffic alerting.

With reference to the high-level flow diagram 200 depicted in FIG. 2, the CTA system 100 iteratively acquires (or receives from the sensing equipment) in step 202 target detection and tracking information associated with any target objects (targets) detected in either of the detection zones 106, 108. Automotive radar modules 110-116 on the host vehicle 102 track changes over time in positional information of one or more detected target(s) and processor 104 uses that information to determine environmental states associated with the detected targets. The driving environment can be classified by processor 104 as a roadway, parking lot, or some other driving scenario. Environmental state information from multiple tracks is typically needed to classify correctly the driving environment. Applicant notes, again, that while various example embodiments herein relate to the use of "radar" and "radar systems," the subject application is not limited to such radio wave based sensing. Rather, the systems and methods described herein may utilize any automotive proximity sensing detector that is able to provide range and angular position information for a target object, such as laser scanning (e.g., LIDAR) based systems, cameras or other image based sensing systems, and the like.

Processor 104 may classify (in step 204) the driving environment based on the quality of (i.e., confidence in) environmental state information associated with the target objects, such as lane position and speed information, and optionally other classifying inputs. In step 206, processor 104 detects environmental states, and if no, or low quality environmental state information has been established, the driving environment is classified as undecided and the alert threshold is dynamically adjusted according to target speed data (in step 208). However, if processor 104 determines the quality of existing environmental state information to be adequately established, the driving environment will be classified (in step 210) based on the environmental information provided by multiple targets. Once the driving environment in the detection zone (106 or 108) is classified as, for example, a roadway in step 210, a proximity threshold alert setting may be permanently set. A target detected within a given alert threshold may prompt processor 104 to trigger an output signal to a response generator 118 that may activate an audio (e.g., via a speaker 120) or visual (e.g., via a display device 122, light, etc.) alarm, or an autonomous driving assist (e.g., braking, etc.) system 124 on the host vehicle 102.

The CTA system 100 may be configured with two pairs of radar sensors, a right and left rear radar modules 110, 112 and right and left front modules 114, 116, with a radar module mounted at each vehicle corner. The sensors 110-116 communicate with an electronic control unit (ECU) 126 that may communicate with and control CTA system 100. The host vehicle 102 may also include one or more view mirrors that may be in communication with the ECU 126 and may include the visual or audio alert capability (speaker 120, or a light, etc.) that can be activated by the response generator 118 of the ECU 126. Alternatively, or in addition, the display device 122 may be mounted on an instrument panel and may be in communication with the ECU 126. The ECU 126 may include memory, such as PROM, EPROM, EEPROM, Flash, or other types of memory, which may include data tables stored therein. The ECU 126 may include multiple separate processors in communication with one another and may be made up of various combinations of hardware and software as is known to those skilled in the art. The ECU 126 may also control one or more autonomous driving system that may be activated in response to a signal output from the CTA system 100.

Figure 3:
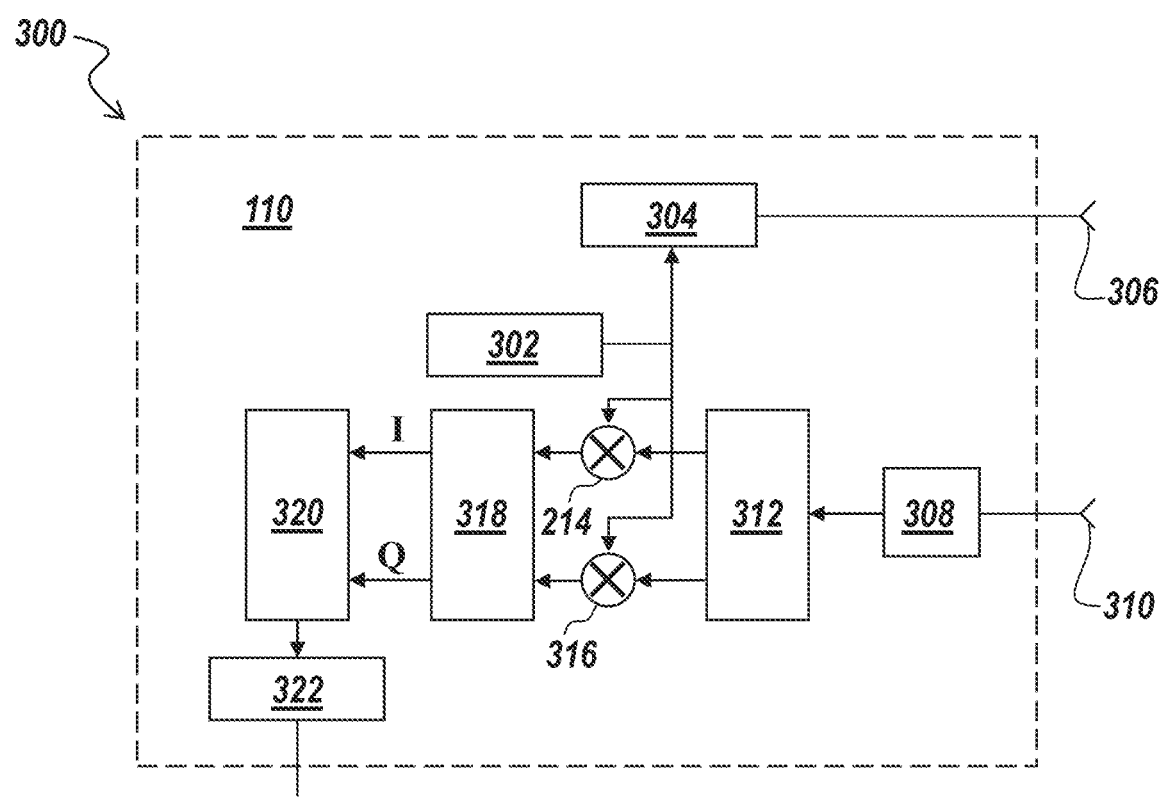
FIG. 3 depicts a schematic block diagram of an example automotive radar system, according to the present disclosure.

With reference to FIG. 3, exemplary radar module 110 processes radar transmit and receive signals that are compatible with a radar system 300 mounted in the host vehicle 102. Radar sensor module 110 generates and transmits radar signals into the detection zone 108 adjacent to the host vehicle that is being monitored by the radar system. Generation and transmission of signals is accomplished by RF signal generator 302, radar transmit circuitry 304 and transmit antenna 306. Radar transmit circuitry 304 generally includes any circuitry required to generate the signals transmitted via transmit antenna 306, such as signal shaping/timing circuitry, transmit trigger circuitry, RF switch circuitry, RF power amplifier circuitry, or any other appropriate transmit circuitry used by radar system 300 to generate the transmitted radar signal according to exemplary embodiments described in detail herein. In some embodiments, the RF signal transmit circuitry 304 may include an RF switch mechanism may rely on inputs from an RF oscillator included in RF signal generator 302. The RF signal transmit circuitry 304 may further advantageously include pulse shaping circuitry, e.g., based on transmit antenna trigonometric calculations.

Radar module 110 may also receive returning radar signals at radar receive circuitry 308 via receive antenna 310. Radar receive circuitry 308 generally includes any circuitry required to process the signals received via receive antenna 310, such as RF low noise amplifier circuitry, signal shaping/timing circuitry, receive trigger circuitry, RF switch circuitry, or any other appropriate receive circuitry used by radar system 300. In some embodiments, radar receive circuitry 308 may also include a receiver antenna select module for selecting the receive antenna from a plurality of receive antennas. In some exemplary embodiments, the received signals processed by radar receive circuitry 308 are forwarded to phase shifter circuitry 312, which generates two signals having a predetermined phase difference. These two signals, referred to as an inphase (I) signal and a quadrature (Q) signal, are mixed with an RF signal from RF signal generator 302 by mixers 314 and 316, respectively, to generate I and Q intermediate frequency (IF) signals. In some embodiments mixing may further be based on pulse shaping of the RF signal from the RF signal generator 302 based on receive antenna trigonometric calculations. The resulting IF signals are further filtered as required by filtering circuitry 318 to generate filtered IF I and Q signals, labeled "I" and "Q" in FIG. 3. The IF I and Q signals are digitized by analog-to-digital converter circuitry (ADC) 320. These digitized I and Q IF signals are processed by a processor, such as a digital signal processor (DSP) 322. In some exemplary embodiments, the DSP 322 can perform all of the processing required to carry out the object detection and parameter determination, including object range, bearing and/or velocity determinations, performed by CTA system 100.

It will be understood that the system configuration illustrated in FIG. 3 is exemplary only and that other system configurations can be used to implement the embodiments described herein. For example, the ordering of filtering of the IF signal and analog-to-digital conversion may be different than the order illustrated in FIG. 3. The IF signal may be digitized before filtering, and then digital filtering may be carried out on the digitized signal(s). In other embodiments, the entire IF stage may be removed so that the RF signal is directly converted to DC for further digitizing and processing.

Figure 4A:
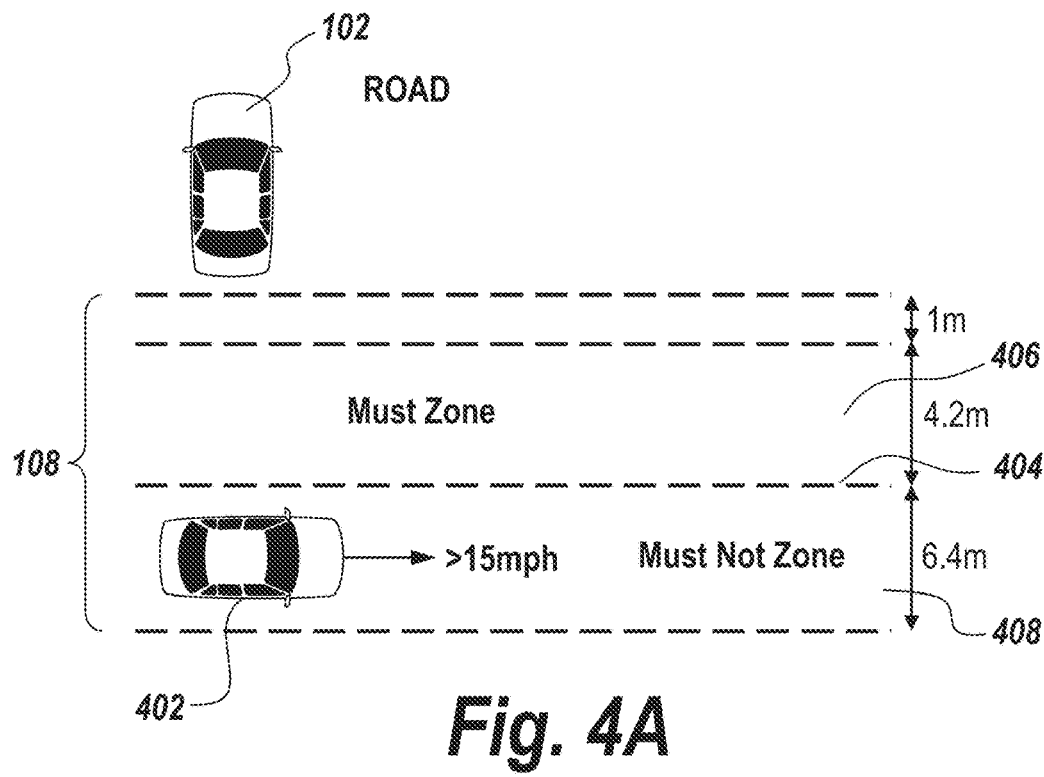
FIGS. 4A and 4B depict exemplary driving environment scenarios, according to the present disclosure.
Figure 4B:
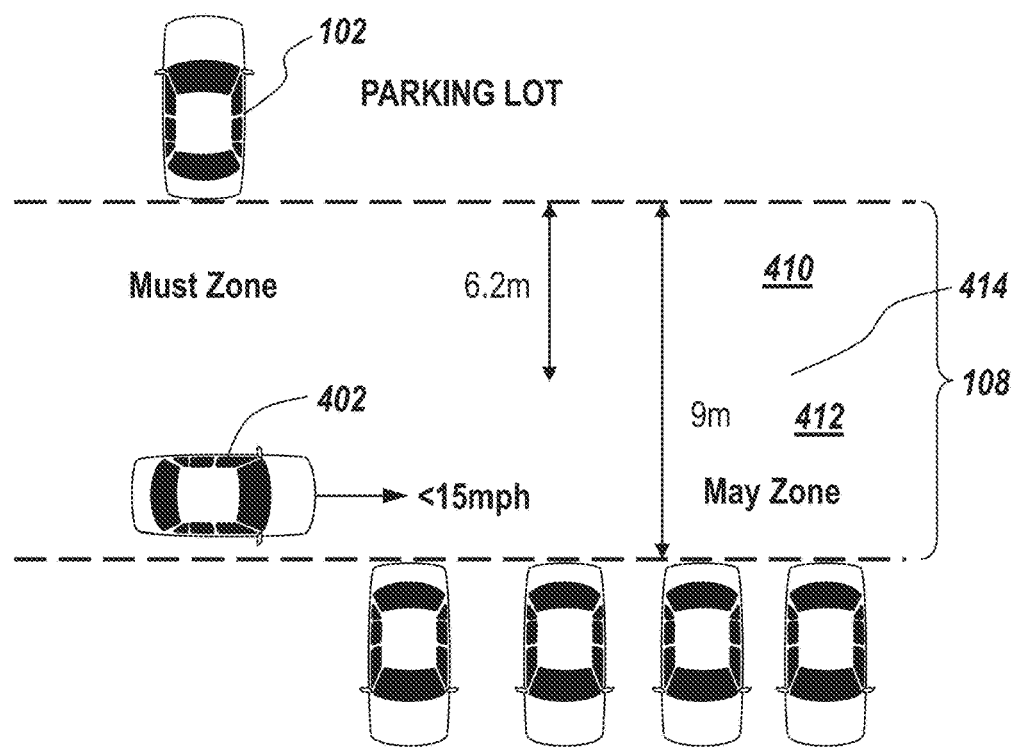

In contrast with conventional cross-path detection systems which utilize a predetermined and static zone alert zone (e.g., as characterized by one or more overlapping regions of interest), the systems and methods of the subject application allow the alert zone to be dynamically adjusted as a function of the driving environment scenario determination. FIGS. 4A and 4B show two example driving environments that the host vehicle 102 may encounter, i.e., backing into a roadway driving environment (FIG. 4A) and backing into a parking lot driving environment (FIG. 4B). A target vehicle 402 is shown traveling past the host vehicle 102 in both scenarios, within detection zone 108 adjacent host vehicle 102 at a distance that may or may not endanger the host vehicle 102.

According to an embodiment, CTA system 100 is enabled when the host vehicle's forward or reverse gear is engaged and while the ignition is switched on. If the switch-on and reverse gear conditions are met, the CTA system 100 is initialized and data entries associated with previous operation may be cleared. The met conditions indicate to CTA system 100 that the driver intends to back up the host vehicle 102. Upon system initialization, the radar system (or other sensing system) may be enabled to measure the range, angle and Doppler to target objects (e.g., target vehicle 402) present in detection zone 108 or that are entering that area. If target vehicle 402 has not been noticed by the driver of host vehicle 102, it is detected, and the CTA system evaluates, based on initial parking lot driving environment (i.e., an example default assumption if no contrary environment state information has been established) associated alert threshold settings and the target positional information, whether to activate an alert for the driver and/or an autonomous driving assist system (e.g., switching on one or more deceleration devices and applying the brakes of host vehicle 102 until it is stationary) in order to avoid a collision with target vehicle 402.

The CTA system 100 may utilize predefined alert zones comprising regions with distinct alerting rules separated by a threshold comprising a longitudinal distance from host vehicle 102. FIG. 4A illustrates an exemplary "must alert" zone 406 and a "must not" alert zone 408, separated by alert threshold 404 and having settings associated with a roadway driving environment scenario. The "must not" alert zone 408 represents an environment or target that should not cause an alert, such as detected stationary objects, shopping carts, moving entry/exit doors, pedestrians, etc. In existing systems, the alert threshold 404 and must/must not zones 406, 408 may be implemented, for example, upon determination that target vehicle 402 is traveling above a certain predetermined speed (e.g., above 15 mph). With respect to the example parking lot driving environment scenario shown in FIG. 4B, an exemplary "must alert" zone 410 and "may alert" zone 412 are separated by a distinct alert threshold 414, all of which may be implemented based on the detected speed of target vehicle 402 exceeding predetermined speed in the detection zone 108. Unfortunately, predefine alert zones can be both over and under inclusive with respect to an otherwise optimal zone of interest for a particular cross-traffic driving environment, resulting in inaccurate detection of a target object (such as providing a false indication of an impending collision or, worse yet, a delayed or inaccurate indication of an impending collision). For example, if target vehicle 402 is traveling at a high speed in a parking lot, the alert rules and settings described would result in a reduced alert threshold 404, and thus a false negative (no alert when one should be issued) could occur. In contrast, road conditions (e.g., traffic light, targets turning on middle lane where vehicles turn into driveways, service drives, heavy traffic, bad weather, etc.) can product slower target vehicle speeds, which will result in wider 'must alert' zones and produce an increase in false positive alerts. It is also known that target vehicles in a middle lane tend to travel slower than surrounding lanes. Use of state information associated with target vehicles determined to be in a middle lane may interfere with alert rules based solely on target vehicle speed.

Figure 5:
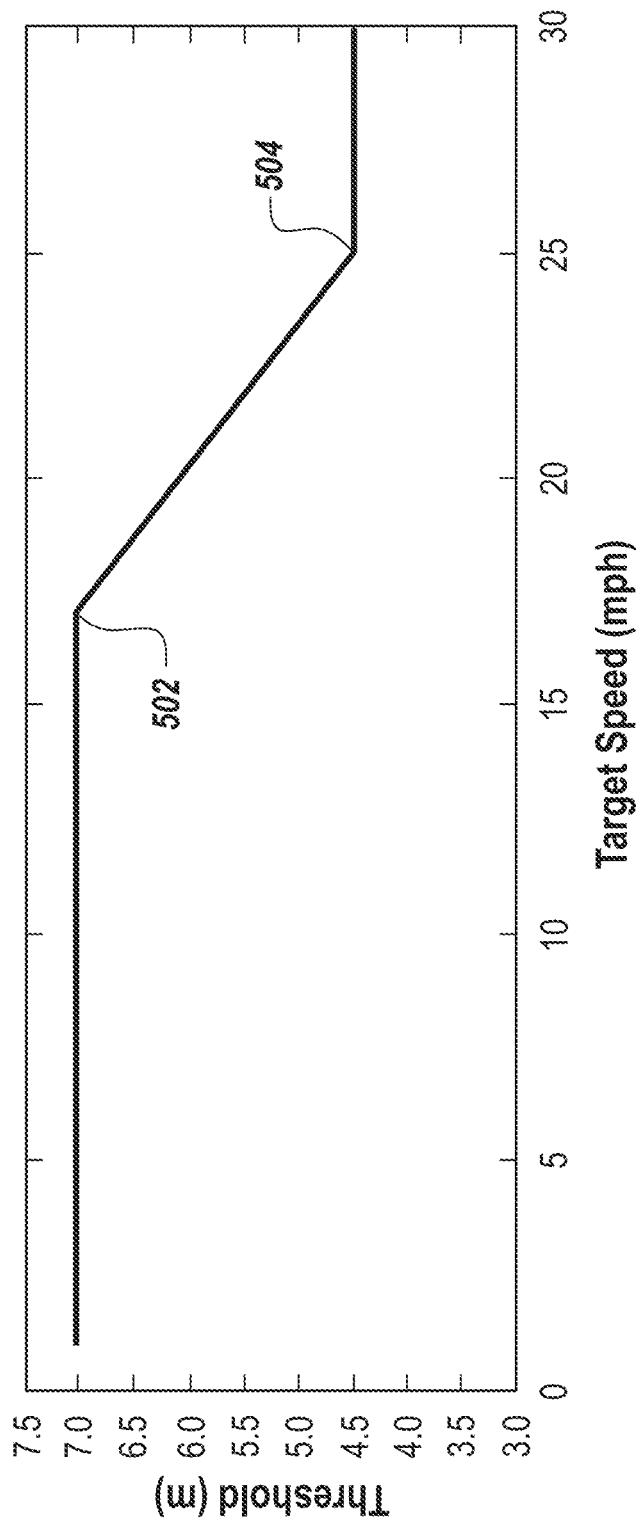
FIG. 5 depicts a smooth threshold alert setting transition within a specific speed range.

Thus, CTA system 100 applies a method 600 (an example embodiment of which shown in flow diagrams of FIGS. 6A-6D) for detecting, learning and filtering tracked target object environmental state information, in order to classify the driving environment in either or both of the detection zone(s) 106, 108 adjacent host vehicle 102. Once the target environmental state information is established and meets selected conditions, the driving environment (e.g., a parking lot, roadway, or other scenario) may be classified, resulting in adaptive application of an appropriate corresponding alert threshold (and optionally, alert zones dimensions and rules) settings. Method 600 employs a target-speed based approach to setting alert zone(s) 410, 412 and threshold 414, in this embodiment corresponding to a parking lot driving environment, until the system learns through analysis of environmental state information that the driving environment represents a different scenario, such as a roadway. The transition between alert zone settings associated with the two driving environment scenarios may be abrupt, or gradual corresponding to target speeds between two transition zone speeds (such as transition range limits 502 and 504 as shown in FIG. 5), which may avoid sudden changes when target speeds are hovering in borderline cases.

Figure 6A:
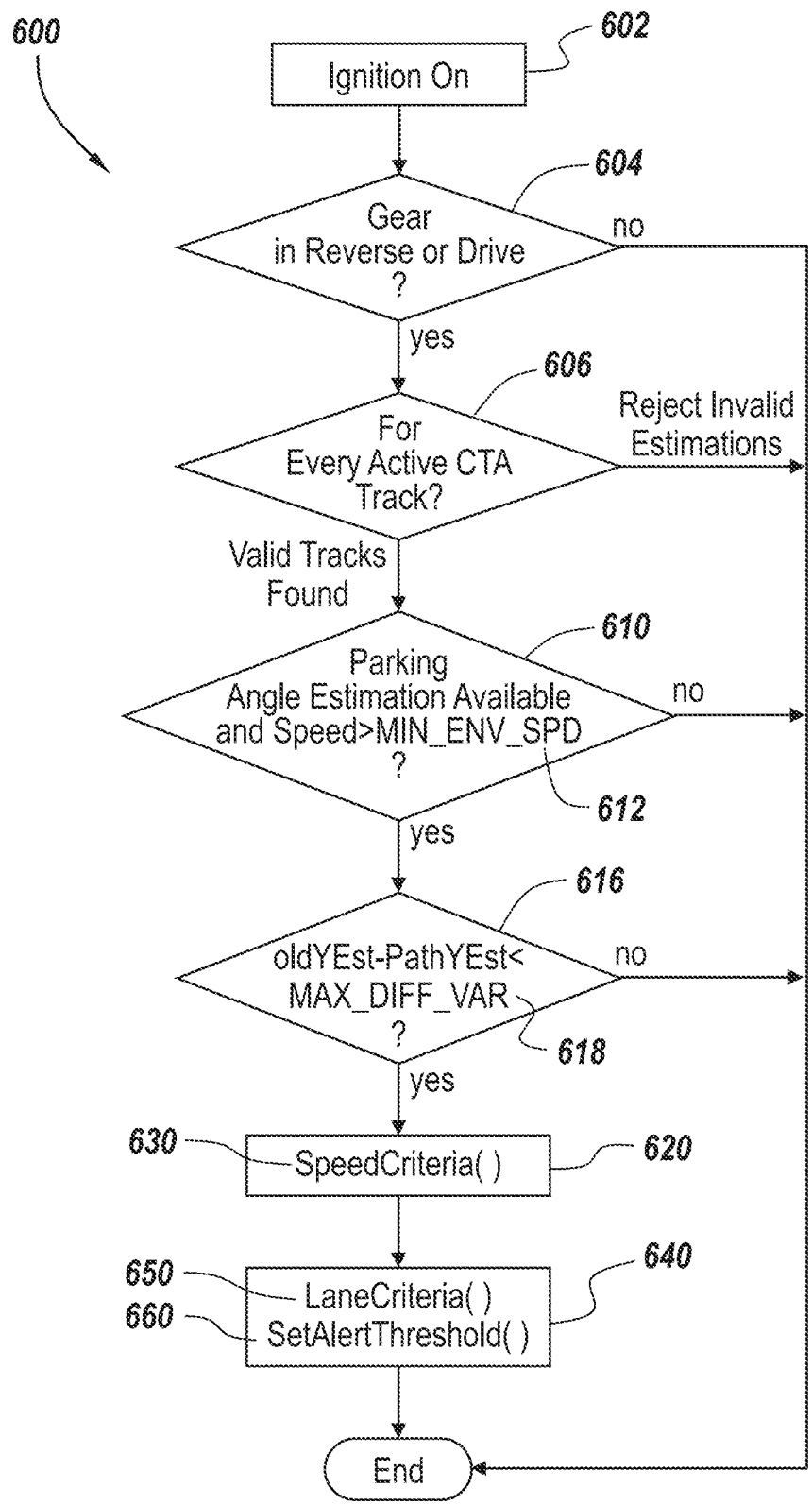
FIGS. 6A through 6D depict flow diagrams for exemplary cross-traffic alerting systems.
Figure 6B:
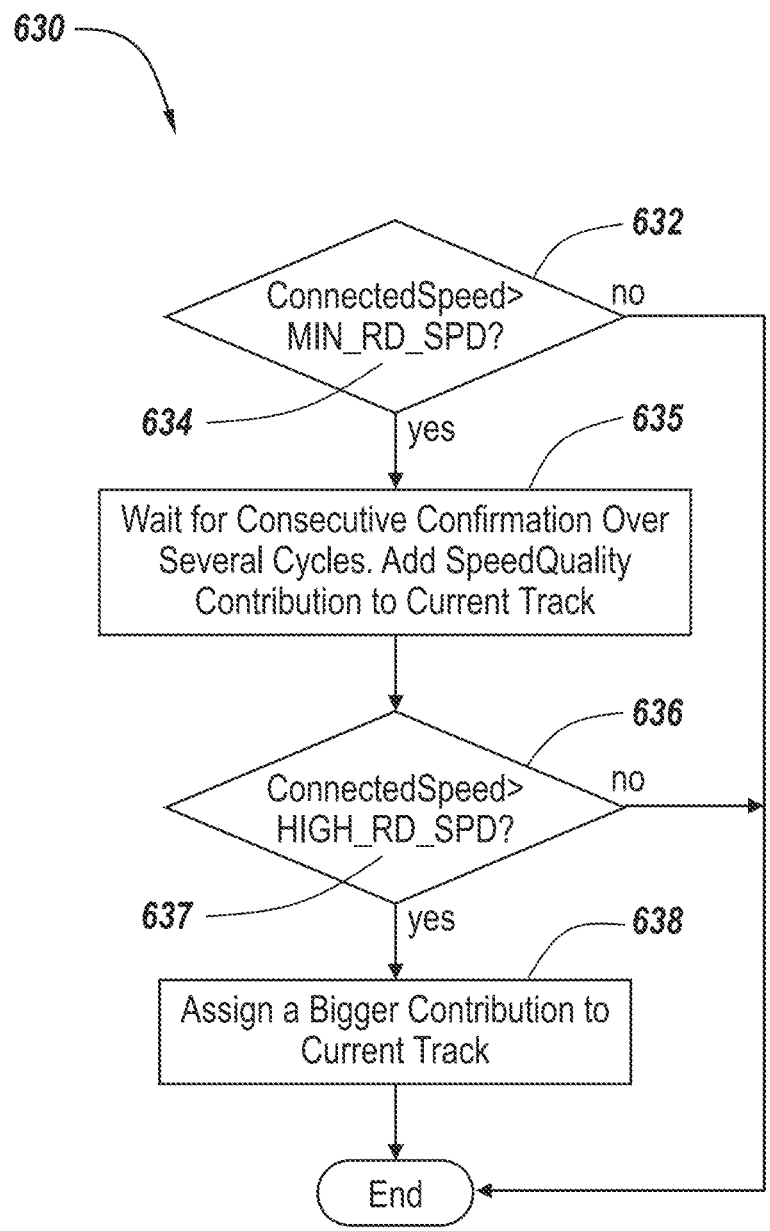
Figure 6C:
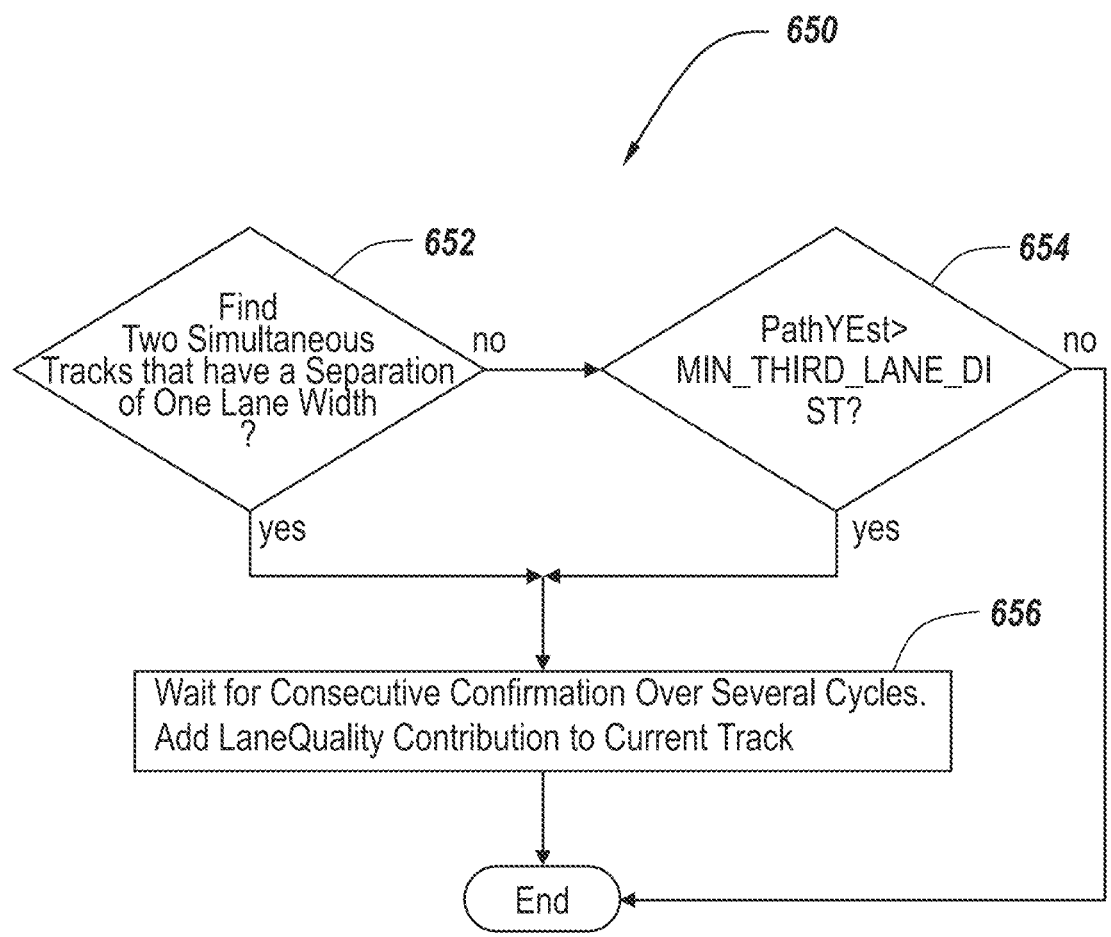
Figure 6D:
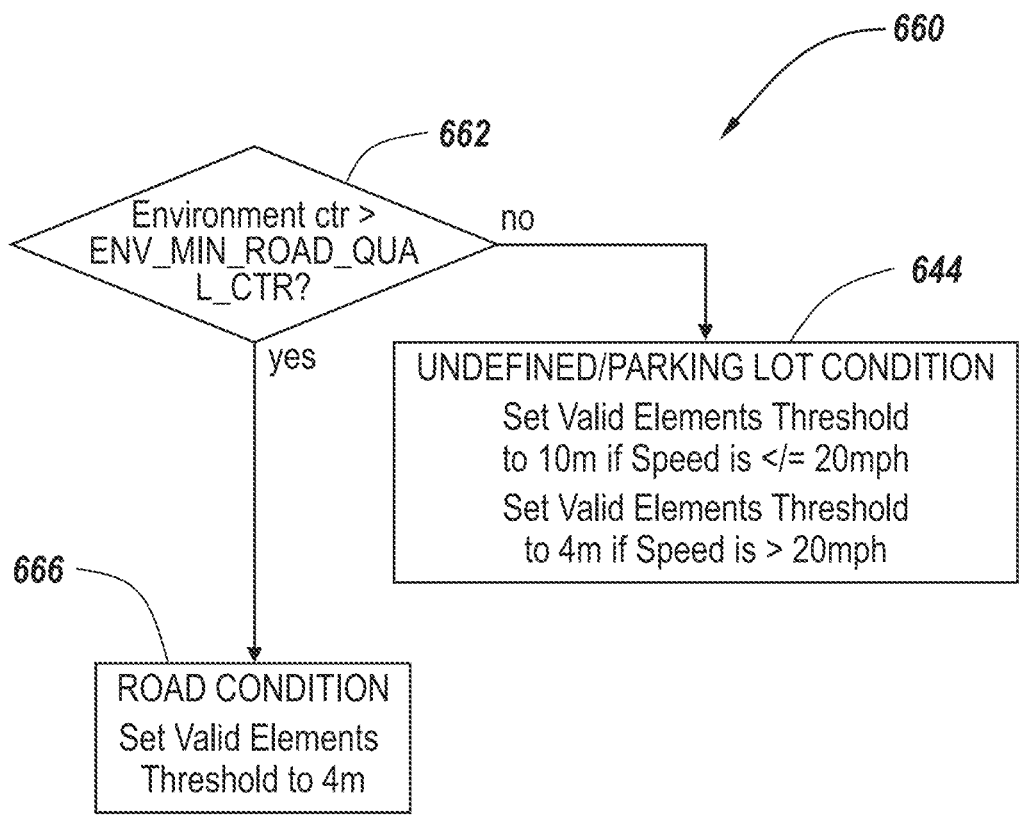

An embodiment of the main function of method 600 performed by CTA system 100 is depicted in FIG. 6A, which is invoked and iteratively/recursively executed after ECU 126 determines (step 602) that the ignition of host vehicle 102 is 'on' and a forward or reverse gear of host vehicle is engaged (determination at step 604). Method 600 calls upon several sub-functions, examples of which are depicted in FIGS. 6B-6D and which are described below. Whether the host vehicle is placed into reverse gear or forward gear will determine which radar modules should be activated to start gathering data in is associated detection zone At step 606, inputs, such as radar information suitable to track one or more target object(s) detected in the detection zone is acquired. The radar data may be converted into target speed and x-y coordinates specifying the position of each detected target. Target tracks may then be determined for each detected target object using two or more data samples. As noted, various technologies and methods are known for determining object environmental state information (e.g., position, speed, trajectory, parking angle, etc.) for detected target objects. One such automotive radar technology is described in U.S. patent application Ser. No. 15/253,343 to Cong et al., filed Aug. 31, 2016, the contents of which are hereby incorporated by reference in their entirety. Target tracks can be characterized by the content and quality of the associated information. The information content is the proposition that, at a particular location in the detection zone, a target object may have particular environmental state information, and the quality is the strength with which that proposition is believed to be true. In some embodiments, the environmental state (i.e., parking lot, road, slow moving road, high speed road, etc.) is classified based on information content that can take many forms, including but not limited to target position, speed, driving lane, heading, acceleration and/or other information types such as GPS data, digital maps, real-time radio inputs and data from real-time transponders such as optical markers. The associated information quality can be evaluated under various reasoning frameworks, such as probability, fuzzy logic, evidential reasoning, or random set.

Multiple samples of target environmental state information for detected targets may be acquired over time. In some embodiments, the data sampling frequency of the sensing system may be actively adjusted. Iterative/recursive determination of the targets' environmental state information may enable adaptive windowing of target track information and the discarding of outlier data, resulting in higher quality state information. In preferred embodiments, cross-path detection may assume a fixed or static host vehicle 102, e.g., such as a vehicle that is just preparing to back out of a parking space or driveway, or that is waiting at an intersection. Assuming a fixed or static host vehicle may advantageously simplify cross-path calculations. The cross-path target tracks may then be filtered in several ways to produce higher quality (more likely accurate) environmental state information.

It is noted that, for a given position of the host vehicle, shortest path distance is configured to remain constant regardless of a current orientation of the host vehicle (with only the relative orientation and not the magnitude of the shortest path distance vector changing). In this way shortest path distance may be used to represent apply a fixed buffer distance for the alert zone regardless of orientation of the host vehicle (for example by applying a fixed threshold with respect to shortest path distance). Thus, in some embodiments, a buffer width of the alert zone may remain constant with only an orientation of the alert zone changing relative to the host vehicle as determined based on the cross-path angle.

The CTA system 100 and methods described herein are configured to dynamically adjust a threshold alert area in the detection zone based on classifications of the driving environment therein. An output signal may then be generated, indicating when one or more of the target objects enter the threshold alert area. One or more processors may be configured to receive target object relative positional data detected by the object detection sensor, detect environmental states associated with the received target data, and perform classifications of the driving environment based on filtered target object positional data when no environmental state has been established, or based on the quality of environmental state information when the environmental state has been established.

While example embodiments and calculations described herein generally relate to a static host vehicle (in the interested of simplicity), it is noted that the present disclosure is not limited to such embodiments. Thus, in some embodiments, cross-path detection may further account for a moving host vehicle. In such embodiments, a position and orientation of the host vehicle at the second point in time may be known relative to the position and orientation of the host vehicle at the first point in time (e.g., based of GPS or other motion tracking of the host vehicle such as gyro or steering wheel angle, speedometer/odometer readings, etc.). This known relative position data may advantageously be used to offset the radar calculations at one or more of the points in time, e.g., so as to provide a common point of reference for the radar inputs (notably the common point of reference may be the host vehicle position and orientation at a first time point, the vehicle position and orientation at a second time point of some other common reference point for vehicle position and orientation). Thus, calculation of cross-path environmental state information may proceed based on the common point of reference using similar calculations described herein (essentially the use of the common reference point for host vehicle position and orientation reduces the calculation to one where the host vehicle is static).

At step 606 of method 600, the system tries to find valid target tracks. An invalid target track has an expired track ID if it is considered to report too much noise to be useful. If no valid ID can be found, processing flows to the end of the main function. At step 610, for target tracks having a valid ID, a determination is made whether a parking angle and target trajectory estimation of the (x,y) position of the target has been calculated, and satisfies defined convergency requirements and whether the target's speed is above a predetermined minimum speed, MIN_SPD 612. If both conditions are true, the track is considered stable and further track filtering may occur. Otherwise, data associated with the track is cleared and processing flows to the end of the main function.

At step 616, a determination is made whether the difference between the prior estimate of the longitudinal distance of the target to the host vehicle and the current estimate exceeds a maximum difference variance threshold, MAX_DIFF_VAR 618. If the threshold is exceeded, data associated with the track is cleared and processing flows to the end of the main function. In step 620, SpeedCriteria( ) function 630 is invoked.

FIG. 6B depicts a flow diagram for the SpeedCriteria( ) function 630 executed by processor 104. The general purpose of function 630 is to generate, for each filtered track meeting the previously described conditions, a contribution toward the correct determination of the driving environment (e.g., parking lot, roadway, etc.) in the detection zone(s) 106, 108 adjacent host vehicle 102. Each track may contribute only once (per main function iteration) based on target speed environmental state information to either or both driving environment conditions. In the disclosed embodiments, multiple tracks contribute to the determination of the driving environment scenario, implemented as increments or decrements to a driving environment counter.

In step 632, processor 104 determines whether the target speed exceeds a minimum threshold speed MIN_RD_SPD (which represents the minimum typical speed on a road) 634. If the target speed is greater than the threshold speed MIN_RD_SPD 634, the current track will contribute to the speed qualifier in step 635 after confirmation for the current track over several cycles. In step 636, processor 104 determines whether the target speed is above an additional threshold speed HIGH_RD_SPD 637 (which represents a typical two lane road speed that will never be achieved in a parking lot). If the target speed is greater than HIGH_RD_SPD 637, then in step 638 the current track will have an increased contribution towards the road environment classification decision.

With reference again to main function of method 600 depicted in FIG. 6A, in step 640 processor 104 invokes two sub-functions: a second driving environment classification function, LaneCriteria( ) function 650 (depicted in FIG. 6C); and a dynamic alert threshold setting function, SetAlertThreshold( ) function 660 (depicted in FIG. 6D) for initializing and dynamically adjusting the alert settings (zones 406-412 and/or alert thresholds 404, 414) in the detection areas 106, 108 adjacent the host vehicle 102, based on the classified driving environment. In preferred embodiments, the alert threshold 404, 414 is defaulted to a threshold corresponding to a parking lot driving environment scenario, until sufficient data acquisition and classification indicates with confidence that the driving environment is actually another environment, such as a roadway.

Lane criteria function 650 (depicted in FIG. 6C) generates additional contributions toward the determination of the parking lot or roadway driving environment, by further classifying valid environmental state (e.g., filtered target track, etc.) information entries. Similarly, each track can only contribute based on its associated target lane information once toward either driving environment conditions. For every available valid track, it is compared against one or more longitudinal distance additional targets to determine if two independent targets are travelling in two different lanes (step 652). A determination is also made (step 654) whether the calculated distance is beyond a third lane, which will indicate a target travelling on the road. If either condition is true (step 652 or step 654) a lane qualifier counter is used to confirm the lane criteria over several cycles (step 656) and if the lane qualifier criteria is confirmed across several cycles for the same target, a lane quality contribution from the track is added to the road driving environment.

The SetAlertThreshold( ) function 660 called upon by processor 104 in step 640 of the main function 600 (and depicted in FIG. 6D) operates to determine (step 662) whether the driving environment counter exceeds a predefined threshold value indicating the presence of a roadway in the detection zone. If a roadway condition is not detected, then in step 664, the driving environment is classified as undefined, and the alert threshold (distance) settings are based on the target speed (as in example FIG. 5). From a target speed of 0 mph to 16 mph the threshold setting may be associated with the parking lot driving environment scenario. If, however, the driving environment counter exceeds the roadway threshold value, then in step 666 the driving environment is classified as a roadway, and the alert threshold (distance) settings associated with the roadway scenario are implemented for the detection zone. As described above, the transition of alert threshold settings may occur abruptly or gradually.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. No element, act, or instruction used herein should be construed as critical or essential unless explicitly described as such. Where only one item is intended, the term "one" or similar language is used. Further, the phrase "based on" is intended to mean "based, at least in part, on" unless explicitly stated otherwise.

The foregoing examples have been provided merely for the purpose of explanation and are in no way to be construed as limiting of the present disclosure.

The invention claimed is:

1. A cross traffic alert system for a host vehicle, comprising:
   one or more object detection sensors mountable to a host vehicle and configured to detect relative positions of a plurality of target objects over multiple time points; and
   a processor configured to:
   receive target object relative positional data detected by the one or more object detection sensors for the plurality of target objects over multiple time points,
   detect environmental state information based on the target object relative positional data received for the plurality of target objects over multiple time points,
   classify a driving environment based, at least in part, on the environmental state information, and
   generate an output signal indicating when one or more of the target objects has entered a threshold alert area, the threshold alert area corresponding to the classified driving environment, wherein the driving environment is classified as one of a plurality of predetermined driving scenarios, each driving scenario associated with corresponding threshold alert area criteria, wherein the threshold alert area is defaulted to a parking lot scenario, until sufficient confidence that the driving environment is another environment is developed.

2. The cross traffic alert system of claim 1, wherein the driving environment is classified as one of a parking lot or a roadway.

3. The cross traffic alert system of claim 1, wherein a transition between threshold alert areas for different driving scenarios is configured to be gradual.

4. The cross traffic alert system of claim 1, wherein classifying the driving environment includes determining target tracks for the plurality of target objects and filtering the target tracks to identify target tracks relevant for classifying the driving environment.

5. The cross traffic alert system of claim 4, wherein filtering the target tracks includes filtering based on an amount of noise reported by the target tracks.

6. The cross traffic alert system of claim 4, wherein filtering the target tracks includes identifying relevant target tracks which include stable trajectories, wherein for each target object, a target trajectory is estimated by solving a multiple hypothesis problem characterized by independent calculations across a first plurality of the time points, the multiple hypothesis problem supposing a plurality of possible cross-path angle solutions, each cross-path angle solution representing a corresponding possible trajectory for the target object.

7. The cross traffic alert system of claim 4, wherein filtering the target tracks includes identifying relevant target tracks which satisfy target track stability requirements.

8. The cross traffic alert system of claim 4, wherein filtering the target tracks includes identifying relevant target tracks which satisfy convergence requirements with the host vehicle based on cross-path angle requirements and a minimum target speed threshold.

9. The cross traffic alert system of claim 4, wherein filtering the target tracks includes identifying relevant target tracks based on an estimate, for each track, of a longitudinal distance of the target to the host vehicle determined as a projection of a distance between a position of the host vehicle and a position of the target object along an axis perpendicular to a trajectory of the target object.

10. The cross traffic alert system of claim 1, wherein the processor classifies the driving environment based on speed and lane data associated with the target objects.

11. The cross traffic alert system of claim 4, wherein the processor classifies the driving environment by aggregating driving environment indications contributed by the relevant target tracts.

12. The cross-traffic alert system of claim 1, wherein the one or more object detection sensors comprise one or more of: (i) a radar system, (ii) a LIDAR system, or (iii) a camera system or image-based sensing system.

13. The cross-traffic alert system of claim 1, wherein the output signal activates one or more of an alert or an autonomous collision avoidance function.

14. The cross traffic alert system of claim 1, wherein classifying the driving environment includes determining a quality of the environmental state information, where if no or low quality environmental state information is established the driving environment is classified as undecided and the threshold alert area is set according to target speed data.

15. The cross traffic alert system of claim 9, wherein filtering the target tracks includes comparing the longitudinal distance to a maximum longitudinal distance threshold.

16. The cross traffic alert system of claim 9, wherein filtering the target tracks includes comparing a difference between current and prior estimates of longitudinal distance to a maximum longitudinal distance variance threshold.

17. The cross traffic alert system of claim 2, wherein for a roadway driving environment, the processor is configured to set a longitudinal distance threshold for the threshold alert area to cover a specified driving lane.

18. The cross traffic alert system of claim 2, wherein for a parking lot driving environment, the processor is configured to set a longitudinal distance threshold for the threshold alert area to cover an entire width of a parking lane.

19. The cross traffic alert system of claim 1, wherein the plurality of target objects are located in a zone of interest in a direction corresponding to an engaged gear position of the host vehicle.

20. The cross traffic alert system of claim 1, wherein the processor is further configured to dynamically adjust the threshold alert area in response to a comparison of at least one of a detected speed, a range or an angle of one or more of the target objects to corresponding speed, range and angle thresholds.

21. The cross traffic alert system of claim 20, wherein the processor is further configured to adjust at least one of the speed, the range or the angle thresholds in response to the classified driving environment.

* * * * *